(12) United States Patent
Corghi

(10) Patent No.: US 10,029,519 B2
(45) Date of Patent: Jul. 24, 2018

(54) OPERATING HEAD FOR A TIRE CHANGER MACHINE

(71) Applicant: CORGHI S.p.A., Correggio (Reggio Emilia) (IT)

(72) Inventor: Giulio Corghi, Correggio (IT)

(73) Assignee: NEXION S.p.A., Correggio (RE) (IT)

( * ) Notice: Subject to any disclaimer, the term of this patent is extended or adjusted under 35 U.S.C. 154(b) by 337 days.

(21) Appl. No.: 15/060,034

(22) Filed: Mar. 3, 2016

(65) Prior Publication Data

US 2016/0272022 A1  Sep. 22, 2016

(30) Foreign Application Priority Data

Mar. 20, 2015  (IT) .............................. BO2015A0140

(51) Int. Cl.
*B60C 25/05* (2006.01)
*B60C 25/132* (2006.01)
*B60C 25/138* (2006.01)

(52) U.S. Cl.
CPC ........ *B60C 25/0563* (2013.01); *B60C 25/138* (2013.01)

(58) Field of Classification Search
CPC ... B60C 25/0563; B60C 25/12; B60C 25/138; B60C 25/132
See application file for complete search history.

(56) References Cited

U.S. PATENT DOCUMENTS 3,517,723 A    6/1970  Hogg et al.
8,291,958 B2 * 10/2012  Bartoli ................ B60C 25/0578
                                                        157/1.17

FOREIGN PATENT DOCUMENTS

EP       1 717 064       11/2006
WO     2014/003774        1/2014

OTHER PUBLICATIONS

Search report and Written Opinion for corresponding Italian application No. BO20150140 dated Nov. 27, 2015.

* cited by examiner

*Primary Examiner* — David B Thomas
(74) *Attorney, Agent, or Firm* — Wegman, Hessler & Vanderburg

(57) ABSTRACT

Described is an operating head (1) for a tire changer machine (2), having a longitudinal axis (L) and a supporting element (9) elongate along a transversal axis (T) relative to the longitudinal axis (L) and facing in a first direction, wherein the supporting element of (9) has a protrusion projecting along an operating direction (W) substantially perpendicular to a reference plane containing the longitudinal axis (L) and the transversal axis (T), and wherein the operating head (1) has a drive element (10), elongate along the transversal axis (T) in a second direction opposite the first direction in which the supporting element (9) faces and a fin (11) protruding in the operating direction (W) to define a guide surface (11a) inclined relative to a plane which is perpendicular to the reference plane and contains the longitudinal axis (L).

20 Claims, 3 Drawing Sheets

OPERATING HEAD FOR A TIRE CHANGER MACHINE

BACKGROUND OF THE INVENTION

This invention relates to an operating head for a machine for fitting and removing a tire (that is, a "tire changer machine"). This invention also relates to a method for fitting a tire.

This invention can advantageously be applied to the sector of tire changer machines of the "conventional type", wherein the removal operation is performed using a manual removal lever; these conventional tire changer machine differ from another type of tire changer machine, which is more automated, wherein the bead breaking is performed by an automatic movement of a fingernail shaped member forming part of the operating head, without the tire service specialist having to manually use an "external" lever.

In general, it should be noted that, in order to perform the removal of a tire from a rim and the subsequent fitting operation, the state of the art consists of tire changer machines having a wheel-holder unit and at least one operating unit.

SUMMARY OF THE INVENTION

The aim of the wheel-holder unit is to support and rotate the wheel relative to an axis and comprises, for example, a locking system which fixes the wheel to a rotary supporting plate.

The operating unit comprises, for example, a plurality of tools designed to be used in different operating steps, which entail:
- detaching the bead of the tire from the annular end (that is, edge) of the rim (process also known as bead breaking);
- removing the tire from the rim, that is, removing the tire from the housing defined by the space between the two annular edges of the rim;
- fitting a new tire on the rim, that is, positioning a new tire in the housing.

The tools are typically coupled to tool holder columns for being movable relative to the wheel-holder unit and performing the bead breaking, removal and fitting operations.

It should be noted that the expression "tire changer machine" is commonly understood to refer to a machine which is able to both remove the tire from the rim and then perform the fitting operation. It should also be noted that the term "bead" denotes the portion of the tire running round the annular edge of the rim when the tire is fitted on the rim.

The operating unit comprises, for example, at least a bead breaker tool. During use, the rubber of the tire bead overheats and the bead adheres to the rim due to a rubber vulcanization phenomena; it therefore necessary to detach the bead from the edge of the rim before starting the removal step. During the bead breaking step, the wheel is rotated by the wheel-holder unit and the bead breaker tool exerts a pressure on the side wall of the tire close to the bead causing detachment from the edge of the rim.

It should be noted that a tire has two beads, corresponding to the two annular edges of the rim, so the tire changer machines usually have a bead breaker tool, or a pair of bead breaker tools, each of which is designed to act on a corresponding bead of the tire.

In conventional tire changer machines, which typically operate by positioning the wheel in such a way that it has a vertical axis, the removal operation comprises positioning an operating head in contact with a portion of a first bead, that is, an upper bead, and using a manual removal lever for extracting the portion of bead from the seat of the rim. The operating head is designed to prevent the return of that portion inside the seat of the rim. The removal operation continues by rotating the wheel and causing the complete escape of the first bead by the action of the operating head which, located in a stationary position relative to the movement of the wheel, makes it possible to progressively extract the first bead from the seat of the rim. To allow the insertion of the removal lever between the tire and rim, use is made, for example, of a tool designed to press on a side of the tire for spacing the first bead from the annular edge of the rim.

The removal operation is completed with the extraction of a second bead, that is, a lower bead, from the seat of the rim, by a process similar to that used for extracting the first bead. This process comprises the use of the operating head to keep a portion of the second bead extracted from the seat of the rim and progressively extracting the second bead during the rotation of the wheel.

In a first step of the fitting operation, the rim is fixed to the wheel-holder unit and a first bead, that is, the lower bead, is inserted inside the seat with the use of the operating head. The operating head located close to a first annular edge, that is, an upper edge of the rim, which is stationary relative to the movement of the rim placed in rotation, presses on the first bead for inserting it progressively in the seat.

The second bead, that is, the upper bead, is then inserted. The operating head located close to of the first annular edge, in a stationary position relative to the movement of the rim, presses on a portion of the second bead of the tire to insert it and keep it in the seat, in such a way as to progressively insert the entire second bead during the rotation of the wheel.

In general, the use of only the operating head is not sufficient for completion of the fitting operation. For example, a wall pressing tool is generally used, located close to the operating head and stationary relative to the movement of the rim, to press on a side of the tire close to of the operating head, acting in conjunction with the latter to keep the bead in the seat.

Other auxiliary tools, for example grippers and clamps, are configured for moving into contact with the rotating rim and/or tire. Such auxiliary tools, which are positioned at predetermined points relative to the wheel, are configured to keep corresponding portions of the second bead inside the seat.

These solutions have some drawbacks linked to the use of numerous tools which increase the complexity and the cost of the tire changer machine. Moreover, the presence of numerous tools increases the number of actions which the user must perform to complete the fitting and removal operations, thereby increasing, as well the time required for the operator, the risk of error, thus consequently reducing the reliability of the machine.

Examples of operating heads for a tire changing machine are provided in patent documents WO2014/003774A1, EP1717064A1 or U.S. Pat. No. 3,517,723A.

The aim of this disclosure is to provide an operating head for a machine for fitting and removing a tire (this is, a "tire changer machine") and a method for fitting a tire which overcome the above mentioned drawbacks of the prior art.

More specifically, the aim of this disclosure is to provide an operating head for a tire changer machine and a method of fitting a tire which are particularly simple and efficient.

A further aim of the disclosure is to provide an operating head for a tire changer machine and a method of fitting a tire which are particularly economic and reliable.

A further aim of this disclosure is to provide an operating head for a tire changer machine which has particularly reduced dimensions.

Yet a further aim of this disclosure to provide a tire changer machine equipped with the operating head.

These aims are fully achieved by the operating head, the tire changer machine and the method according to the disclosure as characterised in the appended claims.

More specifically, the operating head for a tire changer machine comprises a connection element, configured for stably connecting the operating head to an arm of a tire changer machine. Preferably, the connection element is elongate along a longitudinal axis.

Moreover, the operating head comprises a body, having a first end and a second end spaced along a longitudinal axis. The first end faces in a first direction and is connected to the connection element; and the second end faces in a second direction opposite to the first direction (that is, opposite the first end).

The operating head comprises a supporting element integral with the body. Preferably, the supporting element is elongate along a transversal axis (that is, substantially perpendicular) relative to the longitudinal axis and faces in a first direction. Preferably, the supporting element defines a supporting seat for a removal lever. Preferably, the supporting element, has a protrusion projecting along an operating direction substantially perpendicular to a reference plane containing the longitudinal axis and the transversal axis.

Preferably, the operating head comprises a drive element, integral with the body and elongate along the transversal axis in a second direction, opposite the first direction in which the supporting element faces. Even more preferably, the drive element has a protrusion projecting along an operating direction substantially perpendicular to a reference plane containing the longitudinal axis and the transversal axis.

It should be noted that the supporting element is connected to the second end of the body. The drive element is also connected to the second end of the body. The supporting element and the drive element extend, transversally to the axis longitudinal axis, in substantially opposite directions.

The operating head according to a preferred embodiment of the disclosure comprises a fin integral with the body and protruding in the operating direction to define a guide surface. The guide surface is inclined relative to a plane which is perpendicular to the reference plane and contains the longitudinal axis, to make contact with and guide a bead of the tire and facilitate an insertion in a seat defined by the rim. Preferably, the fin is inclined relative to a plane perpendicular to the reference plane and containing the longitudinal axis by an angle of between 20 and 80 degrees. Even more preferably, the fin is inclined relative to a plane perpendicular to the reference plane and containing the longitudinal axis by an angle of between 50 and 70 degrees.

In an example embodiment, the fin is removably connected to the body.

In an example embodiment, the fin is made of a resilient material for adapting operatively to tires with a different hardness or size.

In a further example embodiment, the fin is connected to the body for being movable relative to it between at least two operating configurations.

For example, the fin is connected to the body for being movable along a predetermined trajectory for adapting operatively to the movements of the tire during the fitting step. Preferably, this solution is accomplished by a guide formed on the body.

In a further example embodiment, the drive element is connected to the body for tilting about a tilting axis. Preferably, the tilting axis is substantially parallel to the operating direction.

Preferably, the guide surface of the fin is substantially planar.

In an example embodiment, the guide surface of the fin is curved.

According to an example embodiment, the guide surface of the fin is inclined relative to a plane which is perpendicular to the reference plane and contains the transversal axis.

According to an example embodiment, the fin is positioned, relative to a direction defined by the longitudinal axis, in an intermediate position between the connecting element and the drive element and supporting element.

According to an example embodiment, the drive element and the supporting element are positioned, relative to a direction defined by the longitudinal axis, substantially at a same level. Preferably, the body has at least one portion positioned, relative to a direction defined by the longitudinal axis, in an intermediate position between the connecting element and the drive element and supporting element. Even more preferably, the fin is projecting from the portion of the body.

According to an example embodiment, the body, the supporting element, the drive element and the fin of the operating head are made as one piece. Preferably, the operating head is made from a polymeric material or a metallic material.

According to a further example embodiment, the connecting element, the body, the supporting element, the drive element and the fin of the operating head are made as one piece.

It should be noted that the operating head configured in this way allows the fitting of the tire without the need for a wall pressing tool, which typically acts in conjunction with the operating head in the prior art tire changer machines. This is made possible thanks the action exerted on the bead by the supporting element and by the fin. It should be noted that the fin allows contact to be made with the bead during rotation of the wheel, for guiding to a predetermined position wherein the supporting element presses on it for inserting it in the seat of the rim. This solution considerably simplifies the tire changer machine, with a consequent reduction of the costs and an increase in reliability.

Preferably, the operating head comprises a connecting flange configured for connecting to an arm for moving a tire changer machine.

This disclosure also relates to a machine for fitting and removing a tire relative to a corresponding rim of a vehicle wheel, comprising a wheel-holder unit rotating about an axis of rotation and a tool holder column. The machine comprises at least one tool holder arm, movably coupled to the tool holder column, and an operating head coupled to a end of the tool holder arm for performing the fitting and removing operations. According to the disclosure, the operating head has one or more of the features described above.

This disclosure also defines a method for fitting a tire on a rim of a wheel for vehicles, comprising the following steps:

preparing a wheel-holder unit configured for supporting the rim and rotating it about an axis of rotation oriented according to a longitudinal direction;

fixing the rim to the wheel-holder unit;
preparing an operating head having a longitudinal axis and a supporting element elongate along a transversal axis relative to the longitudinal axis and facing in a first direction, wherein the supporting element of has protrusion projecting along an operating direction substantially perpendicular to a reference plane containing the longitudinal axis and the transversal axis and wherein the operating head has a drive element, integral with the body and elongate along the transversal axis in a second direction opposite the first direction in which the supporting element faces and a fin protruding in the operating direction to define a guide surface inclined relative to a plane which is perpendicular to the reference plane and contains the longitudinal axis;
positioning the operating head close to an annular edge of the rim, with the relative longitudinal axis parallel to the axis of rotation of the wheel-holder unit;
rotating the wheel-holder unit and the rim fixed to it in the predetermined direction.

Preferably, the operating head is positioned in a zone of the annular edge of the rim so the drive element, the fin and the supporting element are positioned in succession relative to a predetermined direction of rotation of the rim. Preferably, during the rotation of the wheel-holder unit, the supporting element comes into contact with a first portion of a bead of the tire to insert it in a seat of the rim and, simultaneously, the fin comes into contact with a second portion of the bead for guiding the insertion in the seat.

BRIEF DESCRIPTION OF THE DRAWINGS

This and other features of the disclosure will become more apparent from the following detailed description of a preferred, non-limiting example embodiment of it, with reference to the accompanying drawings, in which.

DESCRIPTION OF THE PREFERRED EMBODIMENTS

Figure 1:
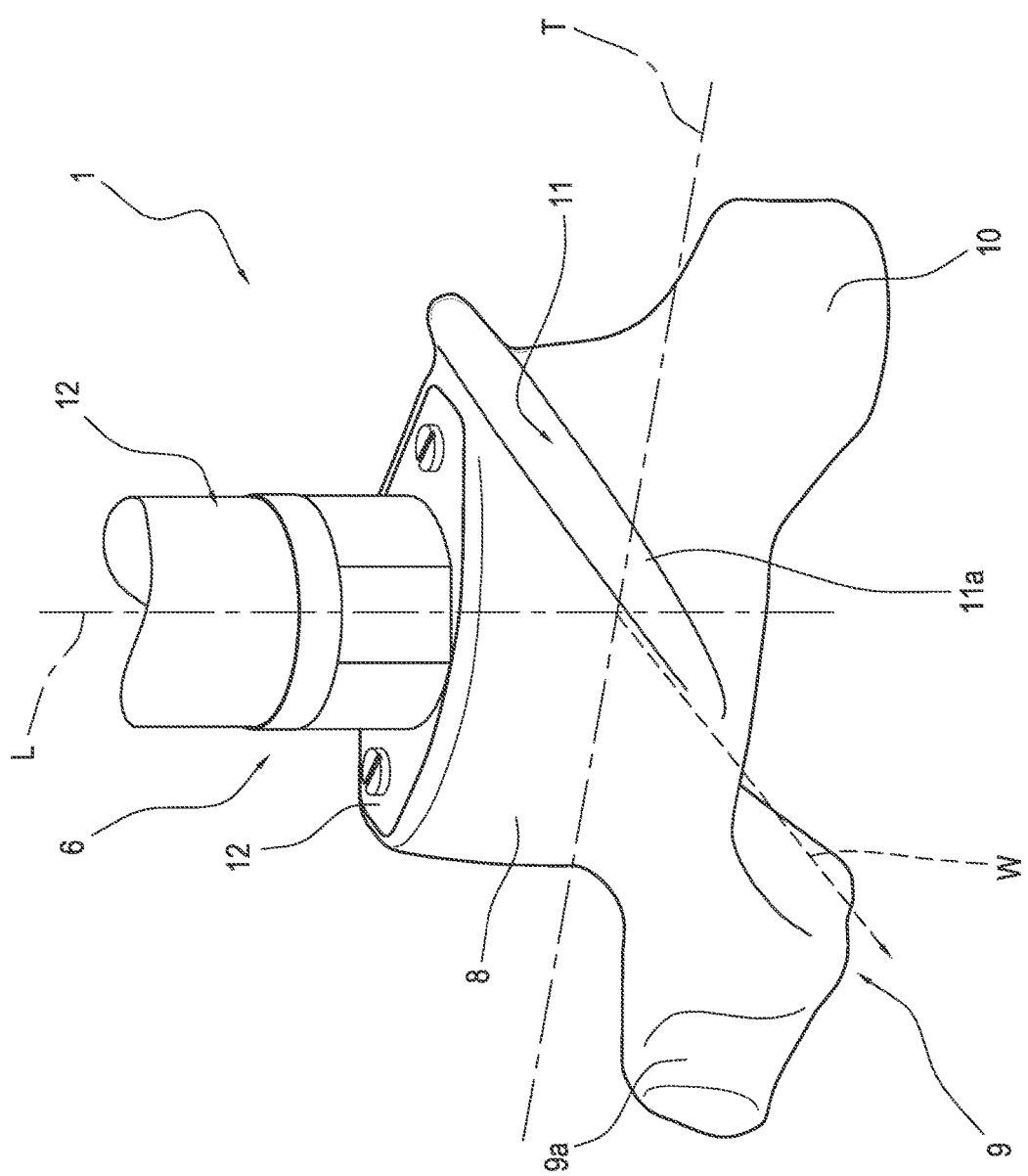
FIG. 1 illustrates a perspective view of an operating head according to this disclosure.
Figure 2:
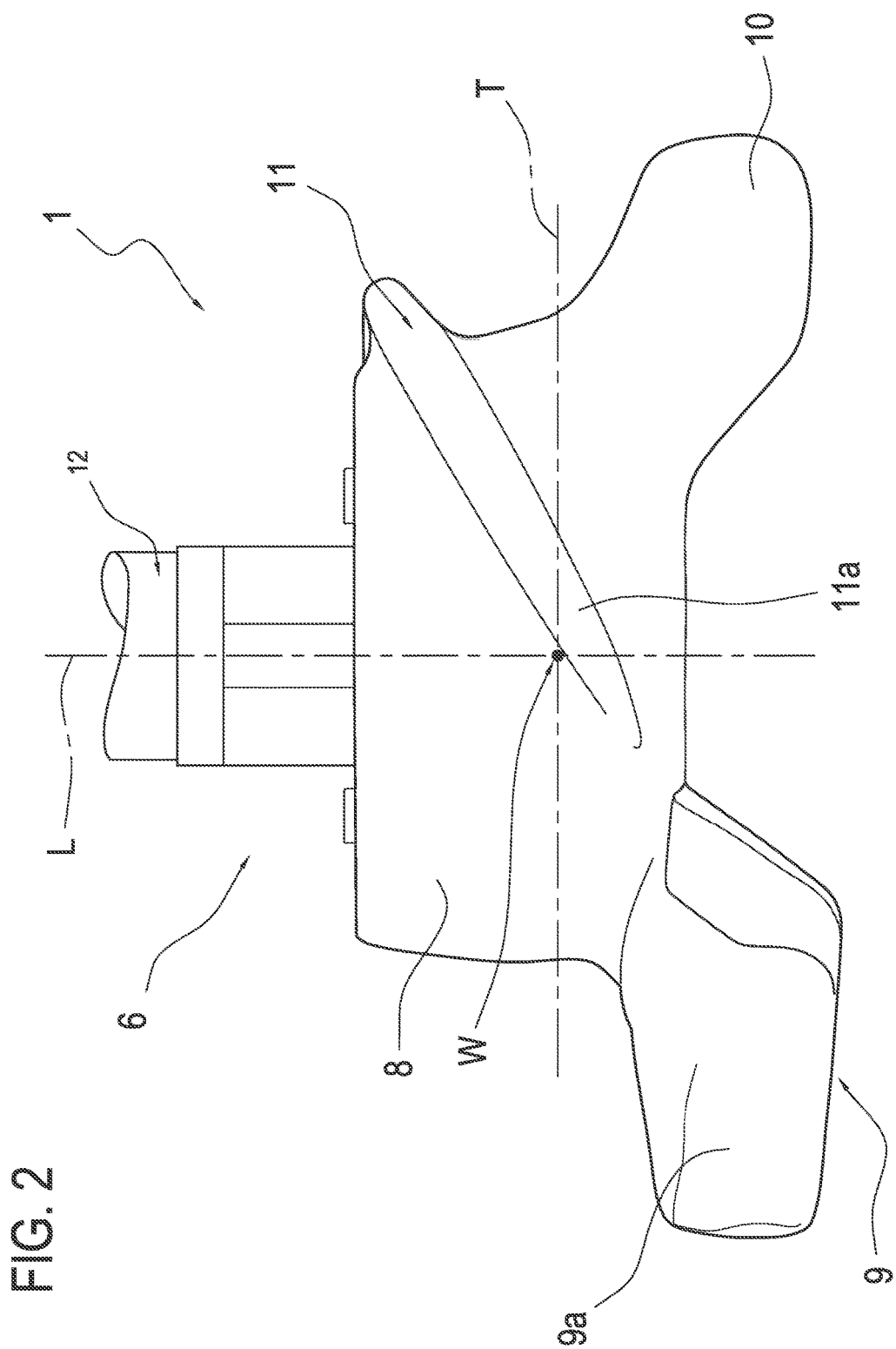
FIG. 2 illustrates a front view of the operating head of FIG. 1.
Figure 3:
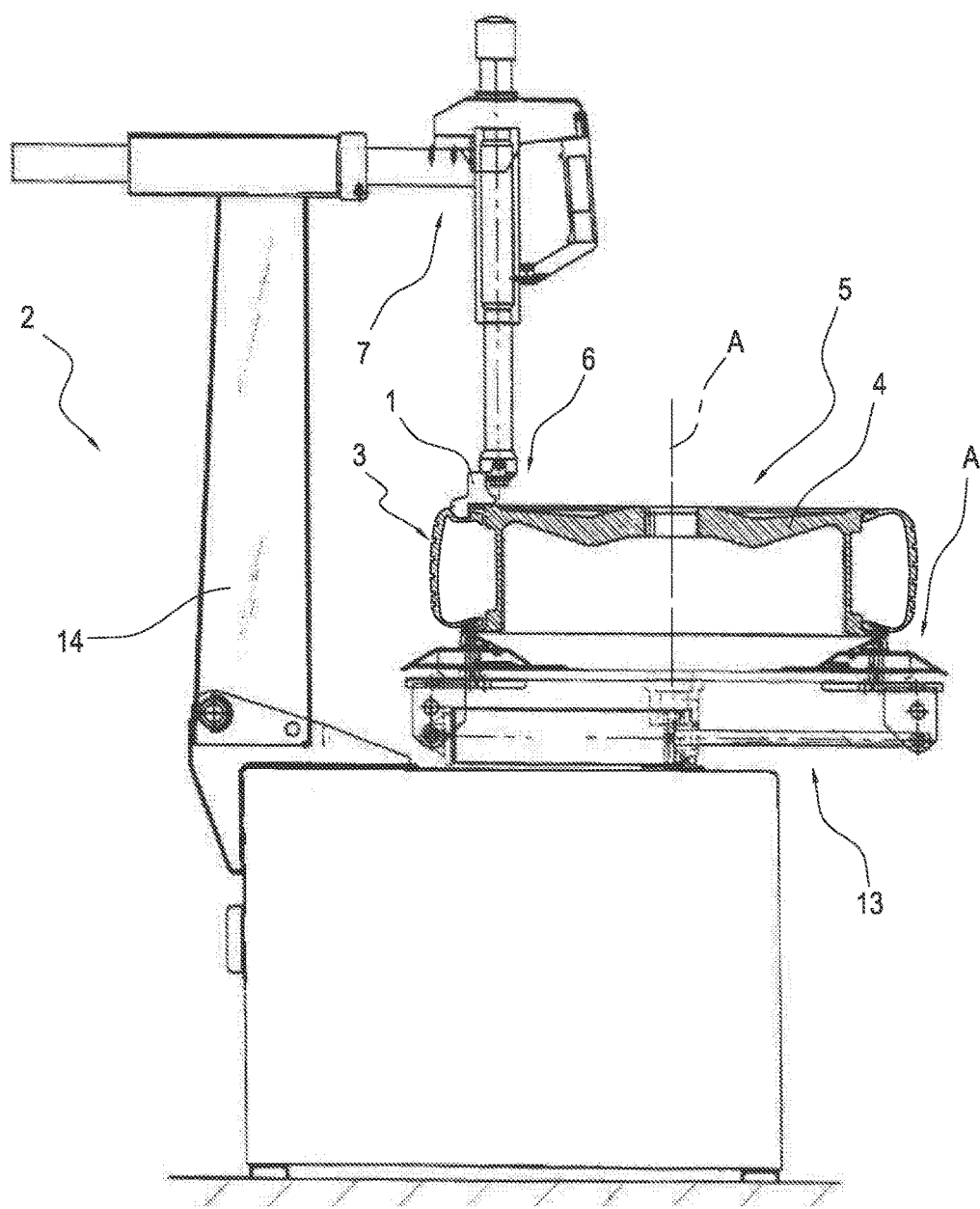
FIG. 3 illustrates a side view, with some parts cut away in order to better illustrate others, of a tire changer machine according to this disclosure.

With reference to the accompanying drawings, the numeral 1 denotes an operating head for a machine 2 for fitting and removing a tire 3 (that is, a tire changer machine) on/from a corresponding rim 4 of a wheel 5 according to this disclosure.

More specifically, the operating head 1, according to the disclosure, comprises a connecting element 6 designed for stably connecting the operating head 1 to an arm 7 of the machine 2. Preferably, the connecting element 6 is elongate along a longitudinal axis L.

The operating head 1 comprises a body 8 having a first end and a second end spaced along a longitudinal axis L. The first end faces in a first direction and is connected to the connecting element 6; the second end faces in a second direction, opposite to the first end.

The operating head 1 comprises a supporting element for integral with the body 8. Preferably, the supporting element 9 is elongate along a transversal axis T relative to the longitudinal axis L and faces in a first direction. Preferably, the supporting element 9 defines a supporting seat 9a for a removal lever (not illustrated). Even more preferably, the supporting element 9 has a protrusion projecting along an operating direction W substantially perpendicular to a reference plane containing the longitudinal axis L and the transversal axis T.

Preferably, the operating head 1 comprises a drive element 10, integral with the body 8 and elongate along the transversal axis T in a second direction, opposite the first direction in which the supporting element 9 faces. Even more preferably, the drive element 10 has a protrusion projecting in the operating direction W.

According to an example embodiment, the operating head 1 comprises a fin 11 integral with the body 8 and protruding in the operating direction W to define a guide surface 11a. The guide surface 11a is inclined relative to a plane which is perpendicular to the reference plane and contains the longitudinal axis L, to make contact with and guide a bead of the tire 3 and facilitate an insertion in a seat defined by the rim 4. Preferably, the fin is inclined relative to a plane perpendicular to the reference plane and containing the longitudinal axis L by an angle of between 20 and 80 degrees. Preferably, the guide surface 11a of the fin 11 is substantially planar. In a further example embodiment, the guide surface 11a of the fin 11 is curved.

According to an example embodiment, the guide surface 11a of the fin 11 is inclined relative to a plane which is perpendicular to the reference plane and contains the transversal axis T.

According to an example embodiment, the fin 11 is positioned, relative to a direction defined by the longitudinal axis L, in an intermediate position between the connecting element 6 and the drive element 10 and supporting element 9.

According to an example embodiment, the drive element 10 and the supporting element 9 are positioned, relative to a direction defined by the longitudinal axis L, substantially at a same level. Preferably, the body 8 has at least one portion positioned, relative to a direction defined by the longitudinal axis L, in an intermediate position between the connecting element 6 and the drive element 10 and supporting element 9. Even more preferably, the fin 11 is projecting from the portion of the body 8.

In an example embodiment, the body 8 of the operating head is shaped to form a circular arc portion, in such a way that the drive element 10 and the supporting element 9 are positioned along a circular arc (which may be approximated with an axis oriented in the transversal direction).

According to an example embodiment, the body 8, the supporting element 9, the drive element 10 and the fin 11 of the operating head 1 are made as one piece. Preferably, the operating head 1 is made from a polymeric material or a metallic material.

Preferably, the operating head 1 comprises a connecting flange 12 configured for connecting to an arm 7 for moving a tire changer machine 2.

This disclosure also relates to a machine 2 for fitting and removing a tire 3 relative to a corresponding rim 4 of a vehicle wheel 5, comprising a wheel-holder unit 13 rotating about an axis of rotation A and a tool holder column 14. The machine 2 comprises a tool holder arm 7, movably coupled to the tool holder column 14, and an operating head 1 coupled to a end of the tool holder arm 7 for performing the fitting and removing operations. According to the disclosure, the operating head 1 has one or more features illustrated in this description.

The operation of the operating head 1 according to this disclosure is described below.

During the removal of a tire 3 from a corresponding rim 4, the operating head 1 is located in the proximity of a first annular edge, in contact with a portion of a first bead, that is, an upper bead, whilst the wheel 5 is fixed on the wheel-holder unit 13. Preferably, the axis of rotation A of the wheel-holder unit 13 is substantially parallel to the longitudinal axis L of the operating head 1. The user uses the supporting seat 9a as a fulcrum for a manual removal lever and extracts the portion of bead from the seat of the rim 4 moving it, relative to a direction defined by the axis longitudinal line L, to a level higher than the supporting element 9. In other words, due to the action of the manual removal lever, the bead passes over the protrusion of the supporting element 9 moving in the longitudinal direction. The protrusion of the supporting element 9 is shaped (operatively elongate in a direction perpendicular to the longitudinal axis L, away from the axis of rotation A) to prevent the return of the portion inside the seat of the rim 4. The removal operation continues by rotating the wheel 5 and causing the complete escape of the first bead by the action of the operating head 1 which, located in a stationary position relative to the movement of the wheel 5, makes it possible to progressively extract the first bead from the seat of the rim 4.

The removal operation is completed with the extraction of a second bead, that is, a lower bead, from the seat of the rim 4, by a process similar to that used for extracting the first bead. This procedure comprises a movement of the tire 3 for carrying the second bead in the proximity of the first annular edge of the rim 4. The operating head 1 keeps a portion of the second bead, previously removed by the manual removal lever, outside the seat of the rim 4 during the rotation of the wheel 5 and progressively extracts the second bead.

In order to fit the tire 3, the rim 4 is fixed to the wheel-holder unit 13 and a first bead, that is, the lower bead, is inserted inside the seat of the rim 4 with the use of the operating head 1. The operating head 1, located close to the first annular edge of the rim 4 and stationary relative to the movement of the rim 4 placed in rotation, presses with the supporting element 9 on the first bead, in the longitudinal direction, for inserting it progressively in the seat of the rim 4.

The tire 3 is then moved to bring the second bead, that is, the upper bead, close to the first annular edge of the rim 4. The operating head 1, located close to of the first annular edge, presses on a first portion of the second bead of the tire to move it, relative to a direction defined by the longitudinal axis L, at a level lower than the first annular edge. This operation is preferably assisted by an auxiliary tool, configured for pressing on a side of the tire and rotating with it during the fitting. It should be noted, however, that this disclosure allows to reduce the need to use the auxiliary tool.

The axis of the tire 3 tends to incline relative to the axis of rotation A (which substantially coincides with the axis of the rim 4). In other words, a second portion of the second bead, which precedes the first portion in a predetermined direction of rotation of the wheel-holder unit 13, is positioned, relative to a direction defined by the longitudinal axis L, at a level higher than the first annular edge, away from the seat of the rim 4.

It should be noted that, considering a reference system integral with the operating head 1, the first portion of bead precedes the second portion in the predetermined direction of rotation of the wheel-holder unit 13. In other words, the first portion of bead precedes the second portion in coming into contact with the operating head 1.

The fin 11 is configured to make contact with the second portion by means of the guide surface 11a. The guide surface 11a is operatively inclined relative to a plane containing the first annular edge of the rim 4 for guiding the second bead into the seat of the rim 4. In other words, the fin 11 operatively defines a protrusion elongate away from the axis of rotation A; the intersection of the guide surface 11a with the reference plane defines a first end of the fin 11, proximal to the supporting element 9, positioned at a level lower than that of the second end of the fin 11, distal from the supporting element 9.

The protrusion of the supporting element 9 allows the second bead, guided by the fin 11, to be kept in the seat of the rim 4, in such a way as to progressively insert the second bead during the rotation of the wheel 5. The drive element 10 is configured to allow a last portion of the second bead to pass over the first annular edge and complete the fitting process.

This disclosure also defines a method for fitting a tire 3 on a rim 4 of a wheel 5 for vehicles, comprising the following steps:

preparing a wheel-holder unit 13 configured for supporting the rim 4 and rotating it about an axis of rotation A oriented according to a longitudinal direction;

fixing the rim 4 to the wheel-holder unit 13;

preparing an operating head 1 having a longitudinal axis L and a supporting element 9 elongate along a transversal axis T relative to the longitudinal axis L and facing in a first direction, wherein the supporting element of 9 has a protrusion projecting along an operating direction W substantially perpendicular to a reference plane containing the longitudinal axis L and the transversal axis T, and wherein the operating head 1 has a drive element 10, elongate along the transversal axis T in a second direction opposite the first direction in which the supporting element 9 faces and a fin 11 protruding in the operating direction W to define a guide surface 11a inclined relative to a plane which is perpendicular to the reference plane and contains the longitudinal axis L;

coupling the tire 3 to the rim 4;

positioning the operating head 1 close to an annular edge of the rim 4, with the relative longitudinal axis L parallel to the axis of rotation A of the wheel-holder unit 13;

rotating the wheel-holder unit 13 and the rim 4 fixed to it in the predetermined direction.

In one example, said coupling of the tire 3 to the rim 4 includes inserting a lower bead of the tire 3 inside a seat of the rim 4. This step of inserting the lower bead of the tire 3 inside a seat of the rim 4 is carried out, for example, through the operating head 1.

Preferably, the operating head 1 is positioned in a zone of the annular edge of the rim 4 so the drive element 10, the fin 11 and the supporting element 9 are positioned in succession relative to a predetermined direction of rotation of the rim 4. Preferably, during the rotation of the wheel-holder unit 13, the supporting element 9 comes into contact with a first portion of a bead of the tire 3 to insert it in a seat of the rim 4 and, simultaneously, the fin 11 comes into contact with a second portion of the bead for guiding the insertion in the seat of the rim 4.

What is claimed is:

1. An operating head for a tire changing machine configured for fitting and removing a tire from a corresponding rim of a wheel for a vehicle, the operating head comprising:

a connecting element designed for stably connecting the operating head to an arm of the machine;

a body having a first end and a second end spaced along a longitudinal axis, wherein the first end faces in a first direction and is connected to the connecting element, and the second end faces in a second direction opposite to the first direction;

a supporting element integral with the body and elongate along a transversal axis relative to the longitudinal axis and facing in a first direction, wherein the supporting element forms a supporting seat for a removal lever and has a protrusion projecting along an operating direction substantially perpendicular to a reference plane containing the longitudinal axis and the transversal axis;

a drive element, integral with the body and elongate along the transversal axis in a second direction opposite the first direction in which the supporting element faces, a fin connected to the body and protruding from the body in the operating direction to define a guide surface inclined, relative to a plane which is perpendicular to the reference plane and contains the longitudinal axis, to make contact with and guide a bead of the tire and facilitate an insertion of the selfsame tire bead in a seat defined by the rim.

2. The operating head according to claim 1, wherein the guide surface of the fin is substantially planar.

3. The operating head according to claim 1, where the guide surface of the fin is inclined relative to a plane which is perpendicular to the reference plane and contains the transversal axis.

4. The operating head according to claim 1, wherein the fin is inclined at an angle of between 20 and 80 degrees relative to a plane perpendicular to the reference plane and containing the longitudinal axis.

5. The operating head according to claim 1, wherein the fin is positioned, relative to a direction defined by the longitudinal axis, in an intermediate position between the connecting element and said drive element and supporting element.

6. The operating head according to claim 1, wherein the drive element and the supporting element are positioned, relative to a direction defined by the longitudinal axis, substantially at a same longitudinal level.

7. The operating head according to claim 6, wherein the body has at least one portion positioned, relative to a direction defined by the axis longitudinal line, in an intermediate position between the connecting element and said drive element and supporting element, wherein the fin is projecting from the portion of the body.

8. The operating head according to claim 1, wherein the body, the supporting element, the drive element and the fin are made as one piece.

9. The operating head according to claim 1, wherein the fin is removably connected to the body.

10. The operating head according to claim 1, wherein the fin is movable relative to the body between a first and a second operating position.

11. The operating head according to claim 1, comprising a connecting flange configured for connecting to an arm for moving a machine for fitting and removing a tire relative to a corresponding rim.

12. An operating head for a tire changing machine configured for fitting a tire from a corresponding rim of a wheel for a vehicle, the operating head comprising:

a connecting element configured for stably connecting the operating head to an arm of the machine;

a body having a first end and a second end spaced along a longitudinal axis, wherein the first end faces in a first direction and is connected to the connecting element, and the second end faces in a second direction opposite to the first direction;

a drive element, integral with the body and elongate along a transversal axis, substantially perpendicular to the longitudinal axis, a fin connected to the body and protruding from the body in an operating direction substantially perpendicular to a reference plane containing the longitudinal axis and the transversal axis, to define a guide surface, wherein the fin is inclined, relative to a plane which is perpendicular to the reference plane and contains the longitudinal axis, to make contact with and guide a bead of the tire and facilitate an insertion of the selfsame tire bead in a seat defined by the rim, wherein said guide surface is flat.

13. The operating head according to claim 12, comprising a supporting element integral with the body and elongate along the transversal axis and facing in a first direction, wherein the supporting element forms a supporting seat for a removal lever and has a protrusion projecting along said operating direction.

14. The operating head according to claim 12, wherein the drive element, is elongate along the transversal axis in a second direction opposite the first direction in which the supporting element faces.

15. The operating head according to claim 12, wherein the fin is removably connected to the body.

16. The operating head according to claim 12, wherein the fin is movable relative to the body between a first and a second operating position.

17. A machine for fitting and removing a tire relative to a corresponding rim of a wheel for a vehicle, comprising:

a wheel-holder unit rotating about an axis of rotation;

a tool holder column;

a tool holder arm, movably coupled to the tool holder column;

an operating head coupled to one end of the tool holder arm, wherein the operating head comprises:

a connecting element configured for stably connecting the operating head to an arm of the machine;

a body having a first end and a second end spaced along longitudinal axis, wherein the first end faces in a first direction and is connected to the connecting element, and the second end faces in a second direction opposite to the first direction;

a drive element, integral with the body and elongate along a transversal axis, substantially perpendicular to the longitudinal axis, a fin connected to the body and protruding from the body in an operating direction substantially perpendicular to a reference plane containing the longitudinal axis and the transversal axis, to define a guide surface, wherein the fin is inclined, relative to a plane which is perpendicular to the reference plane and contains the longitudinal axis, to make contact with and guide a bead of the tire and facilitate an insertion of the selfsame tire bead in a seat defined by the rim.

18. A method for fitting a tire on a rim of a wheel for vehicles, comprising the following steps:

preparing a wheel-holder unit configured for supporting the rim and rotating it about an axis of rotation oriented according to a longitudinal direction;

fixing the rim to the wheel-holder unit;

preparing an operating head having a longitudinal axis and a supporting element elongate along a transversal axis relative to the longitudinal axis and facing in first direction, wherein the supporting element has a protrusion projecting along an operating direction substantially perpendicular to a reference plane containing the longitudinal axis and the transversal axis, and wherein the operating head has a drive element, elongate along the transversal axis in a second direction opposite the first direction in which the supporting element faces and a fin protruding in the operating direction to define a guide surface inclined relative to a plane which is perpendicular to the reference plane and contains the longitudinal axis;

positioning the operating head close to an annular edge of the rim, with the relative longitudinal axis parallel to the axis of rotation of the wheel-holder unit;

rotating the wheel-holder unit and the rim fixed to it in the predetermined direction.

19. The method according to claim 18, wherein the operating head is positioned in a zone of the annular edge of the rim in such a way that the drive element, the fin and the supporting element are positioned in succession relative to a predetermined direction of rotation of the rim, and wherein, during at least a part the rotation of the wheel-holder unit, the supporting element comes into contact with a first portion of a bead of the tire to insert it in seat of the rim and, simultaneously, the fin comes into contact with a second portion of the bead for guiding its insertion in the seat of the rim.

20. The method according to claim 18, comprising a step of inserting a lower bead of the tire inside a seat of the rim, successively to the step of fixing the rim to the wheel-holder unit.

\* \* \* \* \*